United States Patent
Wan et al.

(10) Patent No.: US 8,766,617 B2
(45) Date of Patent: Jul. 1, 2014

(54) METHOD FOR IMPROVING VOLTAGE IDENTIFICATION TRANSIENT RESPONSE AND VOLTAGE REGULATOR

(75) Inventors: Yi-Cheng Wan, Taoyuan County (TW); Jian-Rong Huang, Hsinchu (TW); Cheng-Feng Chung, Taipei (TW); Hung-Chun Peng, Hsinchu County (TW)

(73) Assignee: Richtek Technology Corp, Hsinchu (TW)

( * ) Notice: Subject to any disclaimer, the term of this patent is extended or adjusted under 35 U.S.C. 154(b) by 371 days.

(21) Appl. No.: 13/025,977

(22) Filed: Feb. 11, 2011

(65) Prior Publication Data

US 2012/0153913 A1 Jun. 21, 2012

(30) Foreign Application Priority Data

Dec. 20, 2010 (TW) .............................. 99144836 A

(51) Int. Cl.
*G05F 1/00* (2006.01)
*H02M 3/158* (2006.01)
*H02M 3/156* (2006.01)
*H02M 1/00* (2006.01)

(52) U.S. Cl.
CPC .......... *H02M 3/1588* (2013.01); *Y02B 70/1466* (2013.01); *H02M 2003/1566* (2013.01); *H02M 2001/0009* (2013.01)
USPC ........................................................ 323/285

(58) Field of Classification Search
USPC .......... 323/234, 265, 268, 282–285, 273–275
See application file for complete search history.

(56) References Cited

U.S. PATENT DOCUMENTS

| | | | | |
|---|---|---|---|---|
| 5,497,667 | A * | 3/1996 | Nakaura | 73/862.328 |
| 5,721,480 | A * | 2/1998 | Morioka | 320/134 |
| 5,889,663 | A * | 3/1999 | Tabata et al. | 363/71 |
| 6,583,608 | B2 | 6/2003 | Zafarana et al. | |
| 6,871,289 | B2 | 3/2005 | Pullen et al. | |
| 7,710,084 | B1 * | 5/2010 | Guo | 323/224 |
| 2005/0017767 | A1 * | 1/2005 | Huang et al. | 327/110 |
| 2005/0194952 | A1 * | 9/2005 | Carpenter et al. | 323/283 |
| 2006/0043943 | A1 * | 3/2006 | Huang et al. | 323/222 |
| 2009/0295356 | A1 * | 12/2009 | Huang et al. | 323/284 |
| 2010/0001663 | A1 * | 1/2010 | Wu et al. | 315/308 |

FOREIGN PATENT DOCUMENTS

| | | |
|---|---|---|
| CN | 1592057 | 3/2005 |
| TW | 200505138 A | 2/2005 |

* cited by examiner

*Primary Examiner* — Adolf Berhane
*Assistant Examiner* — Jeffrey Gblende
(74) *Attorney, Agent, or Firm* — WPAT, PC; Justin King

(57) ABSTRACT

An exemplary method for improving voltage identification (VID) transient response is adapted to a voltage regulator and includes steps of: continuously sensing an inductor current of the voltage regulator to thereby output a current sense signal; during a steady state operation period, sampling the current sense signal to thereby obtain a sampling result for providing a droop control signal; after entering a VID transient period from the steady state operation period, holding the sampling result for providing the droop control signal; and taking the droop control signal as a consideration factor of producing a pulse width modulation signal to regulate an output voltage of the voltage regulator.

10 Claims, 4 Drawing Sheets

METHOD FOR IMPROVING VOLTAGE IDENTIFICATION TRANSIENT RESPONSE AND VOLTAGE REGULATOR

FIELD OF THE INVENTION

The present invention relates to voltage regulators, and more particularly to a method of improving voltage identification transient response and a circuit structure of a voltage regulator.

BACKGROUND OF THE INVENTION

The voltage identification (VID) of a modern central processing unit (CPU) is highly dynamic and changes very quickly from low to high and from high to low. A CPU VID transient may occur successively in a very short period, which results in the performance of the computer is not entirely relied on CPU's capability but also depends on the VID chasing speed of the voltage regulator. The CPU will compute the given job only when the output voltage of the voltage regulator settled to the desired VID. In other words, if the VID chasing speed of the voltage regulator cannot meet the given spec, the CPU might be damaged caused by the unsatisfied voltage or will become idle and decline the system's performance critically.

As to an adaptive voltage position (AVP) system, the voltage regulator will generate a current sense signal according a sensed inductor current and then provide a droop control signal according to the generated current sense signal to regulate the output voltage. Referring to FIG. 1A and FIG. 1B, status views of the current sense signal and the output voltage respectively in the situations of VID transient up and VID transient down are shown. It can be found from the VID transient up period of the VID value changing from VID1 to VID2 in FIG. 1A or the VID transient down period of the VID value changing from VID2 to VID1 in FIG. 1B that, the inductor current IL would have extra increase or decrease resulting from the change of VID value, which results in the current sense signal VCS0 increased or decreased correspondingly and thereby the average value of the output voltage VOUT during the transient up or down period is non-linearly changed consequently. Accordingly, the actual settling time Ta of the output voltage VOUT is out of the given settling time spec Ts in the transient up or down period.

SUMMARY OF THE INVENTION

Therefore, the present invention is directed to a method for improving VID transient response, which can settle the output voltage to a target VID value in the given settling time spec of VID transient.

The present invention is further directed to a voltage regulator, which can settle the output voltage to a target VID value in the given settling time spec of VID transient.

In one aspect, a method for improving VID transient response in accordance with an embodiment of the present invention is adapted to a voltage regulator. In particular, the method includes the following steps of: successively sensing an inductor current of the voltage regulator to thereby output a current sense signal; in a steady state operation period, sampling the current sense signal to thereby obtain a sampling result for providing a droop control signal; after entering into a VID transient period from the steady state operation period, holding the sampling result for providing the droop control signal; and using the droop control signal as a consideration factor to generate a pulse width modulation signal for regulating an output voltage of the voltage regulator.

In one embodiment of the present invention, the step of using the droop control signal as a consideration factor to generate a pulse width modulation signal for regulating an output voltage of the voltage regulator includes sub-steps of: performing an amplifying operation to a difference between a feedback value of the output voltage and a VID value to thereby output an error signal; and comparing the error signal with the droop control signal and thereby outputting the pulse width modulation signal according to the comparing result. Alternatively, the step of using the droop control signal as a consideration factor to generate a pulse width modulation signal for regulating an output voltage of the voltage regulator can include sub-steps of: performing an amplifying operation to a difference between the feedback value of the output voltage and a combined signal to thereby output an error signal, wherein the combined signal is obtained by combining the droop control signal with the VID value; and comparing the error signal with a reference signal e.g., ramp signal to thereby output the pulse width modulation signal.

In another aspect, a voltage regulator in accordance with an embodiment of the present invention includes an inductor current sensor, a sample and hold module, and a pulse width modulation comparator. The inductor current sensor is for sensing an inductor current of the voltage regulator to thereby output a current sensor signal. The sample and hold module is electrically coupled to the inductor current sensor to receive the current sense signal and for selectively sampling the current sense signal to thereby provide a sampling result for producing a droop control signal. The pulse width modulation comparator uses the droop control signal as a consideration factor to generate a pulse width modulation signal for regulating an output voltage of the voltage regulator. Moreover, the sampling result is held during a VID transient period of the voltage regulator.

In one embodiment, the voltage regulator is a current-mode voltage regulator or a voltage-mode voltage regulator.

In one aspect, when the voltage regulator is the current-mode voltage regulator, the voltage regulator can further include an error amplifier for outputting the error signal according to the difference between a feedback value of the output voltage and a target VID value. Correspondingly, the pulse width modulation comparator compares the droop control signal with the error signal to thereby generate the pulse width modulation signal.

In another aspect, when the voltage regulator is the voltage-mode voltage regulator, the voltage regulator can further include a droop control module and an error amplifier. The droop control module is for generating the droop control signal according to the sampling result of the sample and hold module. The error amplifier is for outputting an error signal according to the difference between a feedback value of the output voltage and a combined signal. Herein, the combined signal is obtained by combing a target VID value with the droop control signal through a combiner. Correspondingly, the pulse width modulation comparator compares the error signal with a reference signal, e.g., ramp signal to thereby generate the pulse width modulation signal.

In still another aspect, a method for improving VID transient response in accordance with an embodiment of the present is adapted to a voltage regulator. In this embodiment, the method includes the following steps of: during a first steady state operation period of a VID value of the voltage regulator being a first value, sampling a current sense signal of the voltage regulator for providing a droop control signal; during a VID transient period of the VID value changing from the first value to a second value, stopping sampling the current sense signal to thereby hold the droop control signal to be unchanged; and during a second steady state operation period of the VID value being the second value, re-sampling the current sense signal of the voltage regulator for providing the droop control signal. Moreover, the method in this embodiment can further include a step of: taking the droop control signal in consideration to generate a pulse width modulation signal for regulating an output voltage of the voltage regulator.

In summary, in the various embodiments of the present invention, since a sample and hold module is provided in a generation path of the droop control signal, the impact of the extra increase or decrease of the inductor current during the VID transient period applied to the droop control signal of the voltage regulator is blocked, the VID chasing speed of the voltage regulator only is influenced by the output voltage and the VID difference. Accordingly, the present voltage regulator can regulate the output voltage to a target VID value in the given settling time spec of VID transient.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
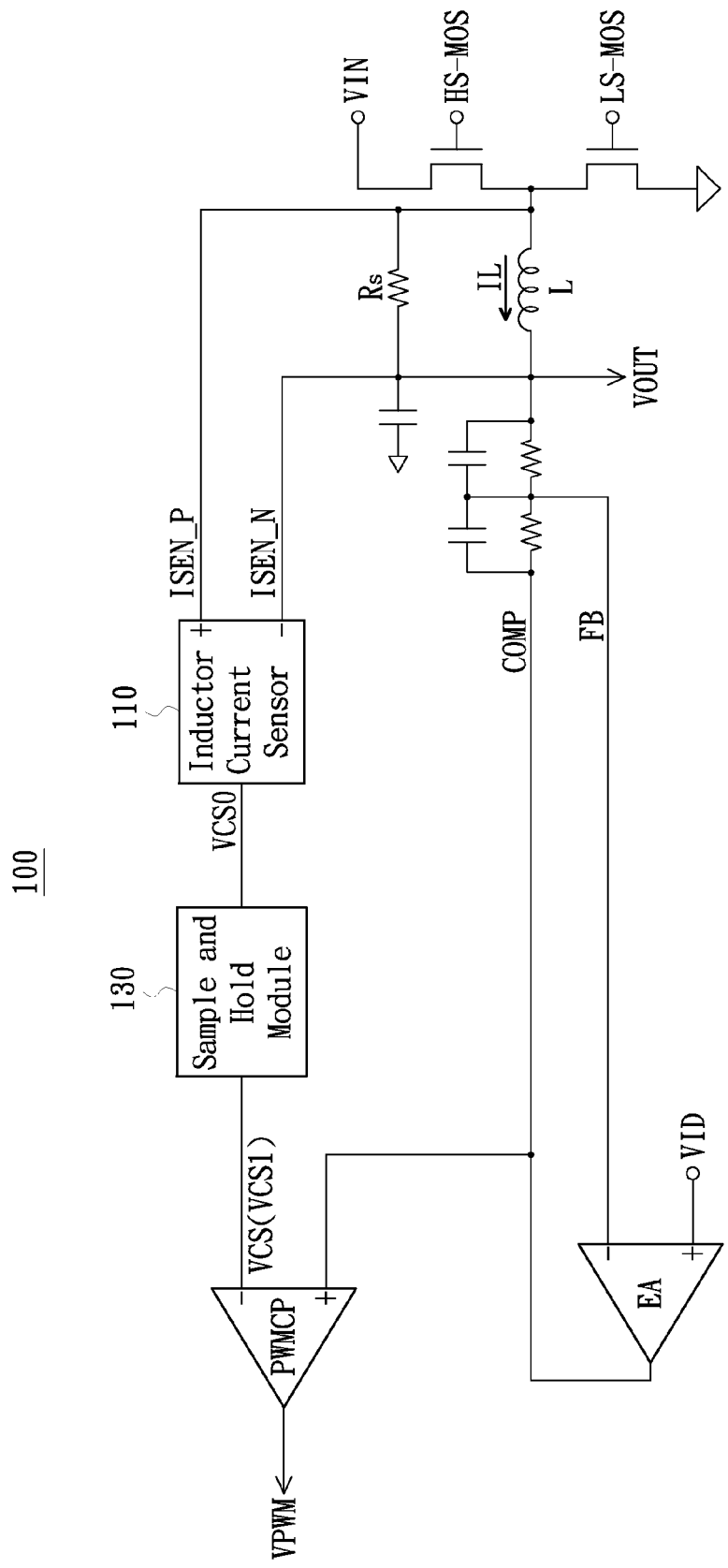
FIG. 2 is a schematic circuit structure of a current-mode voltage regulator in accordance with a first embodiment of the present invention.

Referring to FIG. 2, a schematic circuit structure of a current-mode voltage regulator in accordance with a first embodiment of the present invention is shown. As illustrated in FIG. 2, the voltage regulator 100 receives an input voltage VIN and controls switch transistors HS-MOS, LS-MOS according to a pulse width modulation signal VPWM to regulate an inductor current IL for charging or discharging an output capacitor (not shown in FIG. 2) to thereby provide an output voltage VOUT for a load (e.g., CPU). In the illustrated embodiment, the voltage regulator 100 primarily includes an inductor current sensor 110, a sample and hold module 130, an error amplifier EA and a pulse width modulation comparator PWMCP.

More specifically, the inductor current sensor 110 generates a current sense signal VCS0 according to received voltage signals ISEN_P, ISEN_N respectively on two terminals of a current sense resistor Rs. In the illustrated embodiment, the inductor current sensor 100 can be a voltage amplifier.

The sample and hold module 130 is electrically coupled to the inductor current sensor 110 to receive the current sense signal VCS0 and for selectively sampling the received current sense signal VCS0 to thereby output a sampling result signal VCS1 for providing a droop control signal VCS. In the illustrated embodiment, the sampling result signal VCS1 is directly used as the droop control signal VCS.

The error amplifier EA has a positive input terminal (+) and a negative input terminal (−). The positive input terminal (+) of the error amplifier EA receives a voltage identification value VID. When the voltage regulator 100 is applied to provide an operating voltage for a CPU, the voltage identification value VID can be provided from the CPU. The negative input terminal (−) of the error amplifier EA receives a feedback value FB of the output voltage VOUT. Herein, the error amplifier EA performs an amplifying operation to a difference between the feedback value FB and the voltage identification value VID and then outputs an error signal COMP.

The pulse width modulation comparator PWMCP has a positive input terminal (+) and a negative input terminal (−). The positive input terminal (+) of the pulse width modulation comparator PWMCP receives the error signal COMP outputted from the error amplifier EA, and the negative input terminal (−) of the pulse width modulation comparator PWMCP receives the droop control signal VCS. In the illustrated embodiment, the pulse width modulation comparator PWMCP compares the received error signal COMP with the droop control signal VCS to thereby generate the pulse width modulation signal VPWM for controlling the switch transistors HS-MOS, LS-MOS, so as to achieve the regulation of the output voltage VOUT.

Figure 3A:
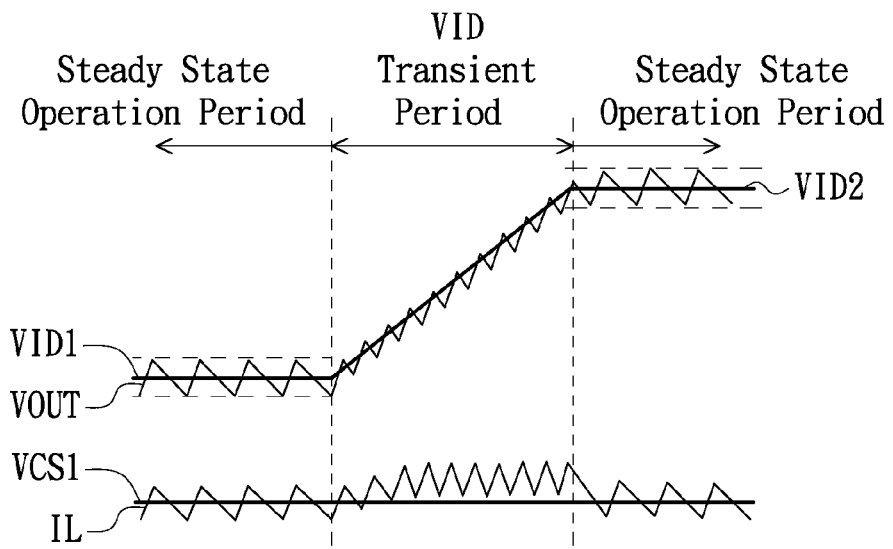
FIGS. 3A and 3B are status views of a sampling result and an output voltage respectively in the situations of VID transient up and VID transient down in accordance with an embodiment of the present invention.
Figure 3B:
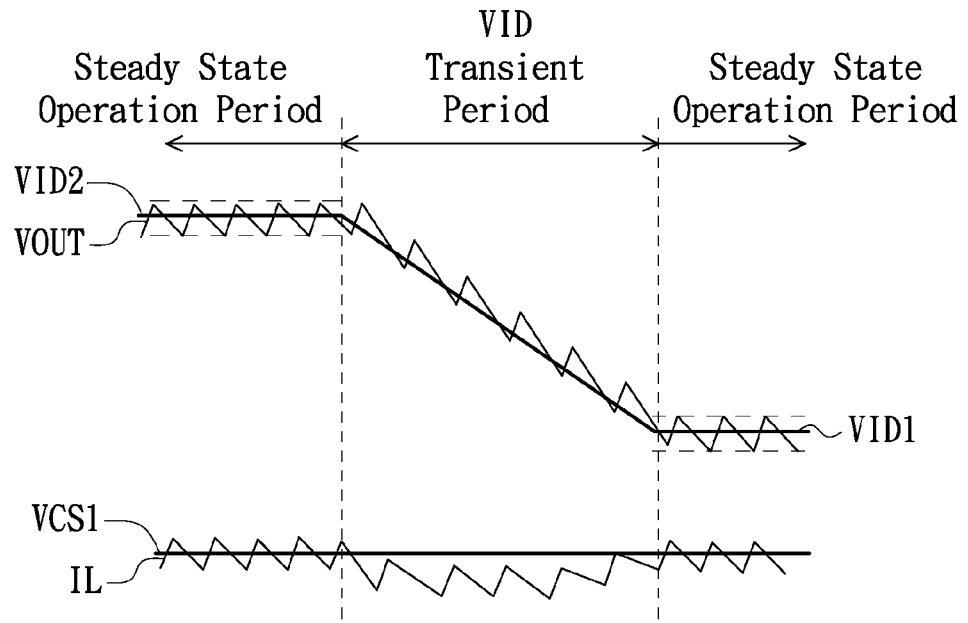

Referring to FIGS. 2, 3A and 3B, FIGS. 3A and 3B show status views of the sampling result signal VCS1 and the output voltage VOUT respectively in the situations of VID transient up and VID transient down. As illustrated in FIGS. 3A and 3B, during the voltage regulator 100 is in operation, the inductor current sensor 110 successively senses the inductor current IL. (1) When the voltage regulator 100 operates at a steady state operation period of the VID value being VID1 (or VID2), the sample and hold module 130 samples the current sense signal VCS0 and then outputs a sampling result signal VCS1 according to the sampling result as the droop control signal VCS. The droop control signal VCS then is provided to the negative input terminal (−) of the pulse width modulation comparator PWMCP. (2) When the voltage regulator 100 operates a VID transient period of the VID value changing from VID1 (or VID2) to VID2 (or VID1), the sample and hold module 130 stops sampling the current sense signal VCS0 according to a received stop sampling command (e.g., issued by the CPU), the sampling result signal VCS1 is kept unchanged so that the droop control signal VCS received by the negative input terminal (−) of the pulse width modulation comparator PWMCP is held unchanged correspondingly. (3) When the voltage regulator 100 operates at another steady state operation period of the VID value being VID2 (or VID1), the sample and hold module 130 re-samples the current sense signal VCS0 and then outputs a new sampling result signal VCS1 according to the sampling result as the droop control signal VCS provided to the negative input terminal (−) of the pulse width modulation comparator PWMCP. In short, the droop control signal VCS is taken as a consideration factor to generate the pulse width modulation signal VPWM by the pulse width modulation comparator PWMCP, the droop control signal VCS is varied along the inductor current IL during the steady state operation periods while kept unchanged during the VID transient periods owing to the block of the impact of the extra increase or decrease of the inductor current IL. Accordingly, during the VID transient period, the output voltage VOUT can be settled to a target VID value in the given settling time spec of VID transient.

Figure 1A:
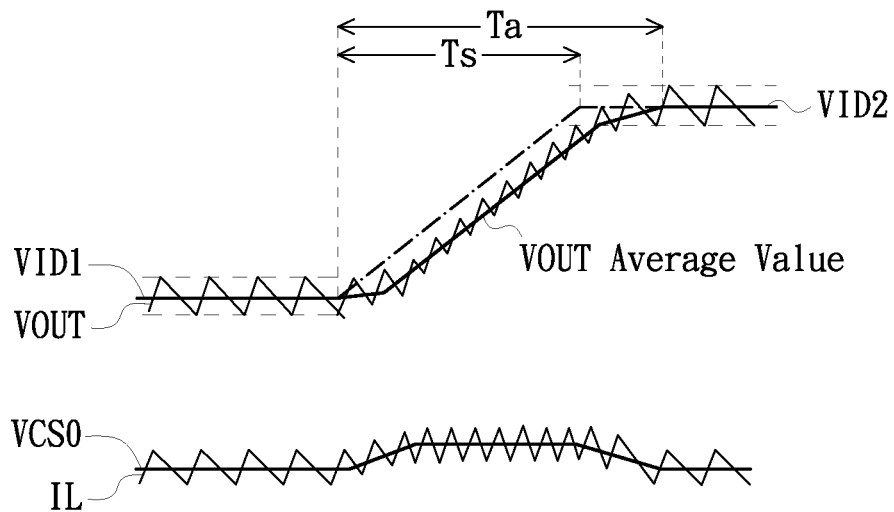
FIGS. 1A and 1B are status views of a current sense signal and an output voltage respectively in the situations of VID transient up and VID transient down in the prior art.
Figure 1B:
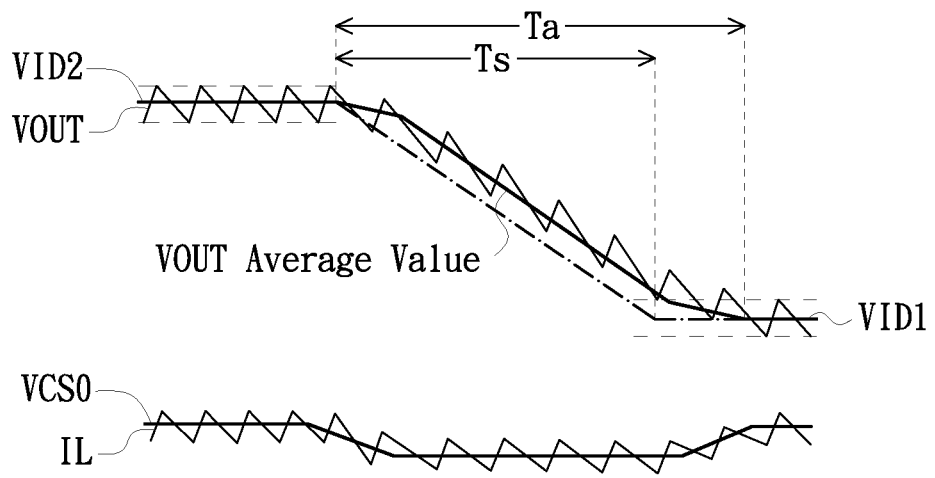

It can be clearly found by comparing FIGS. 3A, 3B associated with the present invention with FIGS. 1A, 1B associated with the prior art that: (a) in the prior art, the current sense signal VCS0 is varied along the change of the inductor current IL during the VID transient periods, so that the VOUT average values respectively in FIGS. 1A, 1B have multiple ramp up or ramp down slopes and thereby the actual settling time Ta of the output voltage VOUT is out of the given settling time spec Ts of VID transient; (b) in the present embodiment, since the sample and hold module 130 is added, the outputted sampling result signal VCS1 is not varied along the inductor current IL during the VID transient periods and thus is kept unchanged, so that each of the VOUT average values during the respective VID transient periods in FIGS. 3A, 3B substantially has a single ramp up or ramp down slope and thereby the output voltage VOUT can be settled to the target VID value in the given settling time spec of VID transient. Accordingly, the purpose of developing the present invention is achieved.

Figure 4:
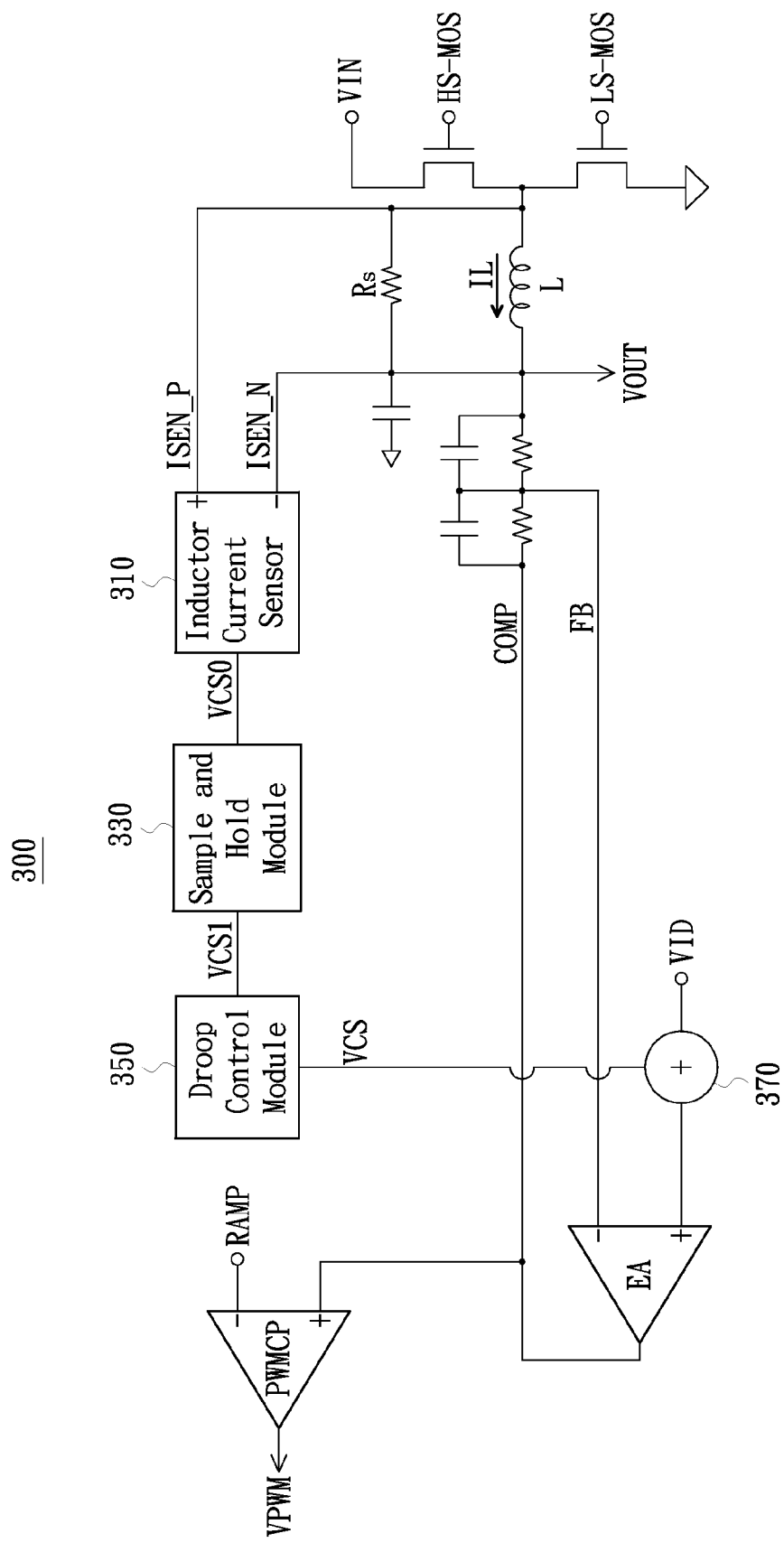
FIG. 4 is a schematic circuit structure of a voltage-mode voltage regulator in accordance with a second embodiment of the present invention.

Referring to FIG. 4, a schematic circuit structure of a voltage-mode voltage regulator in accordance with a second embodiment of the present invention is shown. As illustrated in FIG. 4, the voltage regulator 300 receives an input voltage VIN and controls switch transistors HS-MOS, LS-MOS according to a pulse width modulation signal VPWM to regulate an inductor current IL for charging or discharging an output capacitor (not shown in FIG. 4) to thereby provide an output voltage VOUT for a load. In the illustrated embodiment, the voltage regulator 300 primarily includes an inductor current sensor 310, a sample and hold module 330, a droop control module 350, a comber 370, an error amplifier EA and a pulse width modulation comparator PWMCP.

In particular, the inductor current sensor 310 generates a current sense signal VCS0 according to received voltage signals ISEN_P, ISEN_N respectively on two terminals of a current sense resistor Rs. In the illustrated embodiment, the inductor current sensor 300 can be a voltage amplifier.

The sample and hold module 330 is electrically coupled to the inductor current sensor 310 to receive the current sense signal VCS0 and for selectively sampling the received current sense signal VCS0 to output a sampling result signal VCS1. The sampling result signal VCS1 subsequently is used for providing a droop control signal VCS.

The droop control module 350 is electrically coupled to the sample and hold module 330 to receive the sampling result signal VCS1 and then outputs the droop control signal VCS according to the sampling result signal VCS1. After that, the droop control signal VCS outputted from the droop control module 350 is combined with a voltage identification value VID by the combiner 370 to thereby provide a combined signal to the error amplifier EA.

The error amplifier EA has a positive input terminal (+) and a negative input terminal (−). The positive input terminal (+) of the error amplifier EA receives the combined signal formed by the voltage identification value VID and the droop control signal VCS. When the voltage regulator 300 is applied to provide an operating voltage for a CPU, the voltage identification value VID can be provided from the CPU. The negative input terminal (−) of the error amplifier EA receives a feedback value FB of the output voltage VOUT. Herein, the error amplifier EA performs an amplifying operation to a difference between the feedback value FB and the combined signal and then outputs an error signal COMP.

The pulse width modulation comparator PWMCP has a positive input terminal (+) and a negative input terminal (−). The positive input terminal (+) of the pulse width modulation comparator PWMCP receives the error signal COMP outputted from the error amplifier EA, and the negative input terminal (−) of the pulse width modulation comparator PWMCP receives a reference signal, e.g., a ramp signal RAMP. In the illustrated embodiment, the pulse width modulation comparator PWMCP compares the received error signal COMP with the ramp signal RAMP to thereby generate the pulse width modulation signal VPWM for controlling the switch transistors HS-MOS, LS-MOS, so as to achieve the regulation of the output voltage VOUT.

Referring to FIGS. 4, 3A and 3B, during the voltage regulator 300 is in operation, the inductor current sensor 310 successively senses the inductor current IL. (1) When the voltage regulator 300 operates at a steady state operation period of the VID value being VID1 (or VID2), the sample and hold module 330 samples the current sense signal VCS0 and then outputs a sampling result signal VCS1 according to the sampling result to the droop control module 350. The droop control module 350 then outputs the droop control signal VCS according to the received sampling result signal VCS1. (2) When the voltage regulator 300 operates a VID transient period of the VID value changing from VID1 (or VID2) to VID2 (or VID1), the sample and hold module 330 stops sampling the current sense signal VCS0 according to a received stop sampling command (e.g., issued by the CPU), the sampling result signal VCS1 is kept unchanged so that the droop control signal VCS outputted from the droop control module 350 is held unchanged correspondingly. As a result, the combined signal received by the positive input terminal (+) of the error amplifier EA is held unchanged. (3) When the voltage regulator 300 operates at another steady state operation period of the VID value being VID2 (or VID1), the sample and hold module 330 re-samples the current sense signal VCS0 and then outputs a new sampling result signal VCS1 according to the sampling result to the droop control module 350, the droop control module 350 then outputs a new droop control signal VCS. In short, the droop control signal VCS is taken as a consideration factor to generate the pulse width modulation signal VPWM by the pulse width modulation comparator PWMCP, the droop control signal VCS is varied along the inductor current IL during the steady state operation periods while kept unchanged during the VID transient periods owing to the block of the impact of the extra increase or decrease of the inductor current IL. Accordingly, during the VID transient periods, the output voltage VOUT can be settled to a target VID value in the given settling time spec of VID transient.

Sum up, in the various embodiments of the present invention, since a sample and hold module is provided in a generation path of the droop control signal, the impact of the extra increase or decrease of the inductor current during the VID transient period applied to the droop control signal of the voltage regulator is blocked, the VID chasing speed of the voltage regulator only is influenced by the output voltage and the VID difference. Accordingly, the present voltage regulator can regulate the output voltage to a target VID value in the given settling time spec of VID transient.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for improving voltage identification transient response, adapted to a voltage regulator which provides an output voltage to a central processing unit (CPU) and receives a voltage identification (VID) value provided by the CPU, and the method comprising steps of:
   continuously sensing an inductor current of the voltage regulator to thereby output a current sense signal;
   during a steady state operation period of the VID value of the CPU keeping at a first value, sampling the current sense signal to thereby obtain a sampling result for providing a droop control signal;
   using the droop control signal as a consideration factor to generate a pulse width modulation signal for regulating the output voltage of the voltage regulator;
   after entering into a VID transient period of the VID value changing from the first value in the steady state operation period to a second value, holding the sampling result to keep the droop control signal unchanged and from being affected by the transient change of the VID value; and
   during a next steady state operation period of the VID value of the CPU keeping at the second value, re-sampling the current sense signal to thereby obtain a new sampling result for providing a new droop control signal.

2. The method according to claim 1, wherein the step of using the droop control signal as a consideration factor to generate a pulse width modulation signal for regulating the output voltage of the voltage regulator comprises:
   amplifying a difference between a feedback value of the output voltage and the VID value to thereby output an error signal; and
   comparing the error signal with the droop control signal to thereby output the pulse width modulation signal.

3. The method according to claim 1, wherein the step of using the droop control signal as a consideration factor to generate a pulse width modulation signal for regulating the output voltage of the voltage regulator comprises:
   amplifying a difference between a feedback value of the output voltage and a combined signal to thereby output an error signal, wherein the combined signal is formed by combining the droop control signal with the VID value; and
   comparing the error signal with a reference signal to thereby output the pulse width modulation signal.

4. A voltage regulator, providing an output voltage to a central processing unit (CPU) and receiving a voltage identification (VID) value provided by the CPU, and the voltage regulator comprising:
   an inductor current sensor, for sensing an inductor current of the voltage regulator to thereby output a current sense signal;
   a sample and hold module, electrically coupled to the inductor current sensor to receive the current sense signal and sample the received current sense signal during a steady state operation period of the VID value of the CPU keeping at a first value to thereby obtain a sampling result for providing a droop control signal; and
   a pulse width modulation comparator, for generating a pulse width modulation signal, by using the droop control signal as a consideration factor, to regulate the output voltage of the voltage regulator;
   wherein the sampling result of the sample and hold module is held unchanged during a VID transient period of the VID value changing from the first value to a second value, to keep the droop control signal unchanged and from being affected by the transient change of the VID value, and the sample and hold module re-samples the current sense signal to thereby obtain a new sampling result for providing a new droop control signal during a next steady state operation period of the VID value of the CPU keeping at the second value.

5. The voltage regulator according to claim 4, wherein the voltage regulator is a type of current-mode voltage regulator.

6. The voltage regulator according to claim 5, further comprising:
   an error amplifier, for outputting an error signal according to a difference between a feedback value of the output voltage and the VID value, wherein the pulse width modulation comparator compares the droop control signal with the error signal to thereby generate the pulse width modulation signal correspondingly.

7. The voltage regulator according to claim 4, wherein the voltage regulator is a type of voltage-mode voltage regulator.

8. The voltage regulator according to claim 7, further comprising:
   a droop control module, for generating the droop control signal according to the sampling result of the sample and hold module; and
   an error amplifier, for outputting an error signal according to a difference between a feedback value of the output voltage of the voltage regulator and a combined signal, wherein the combined signal is formed by combining the VID value with the droop control signal through a combiner;
   wherein the pulse width modulation compares the error signal with a reference signal to thereby generate the pulse width modulation signal.

9. A method for improving voltage identification (VID) transient response, adapted to a voltage regulator which provides an output voltage to a central processing unit (CPU) and receives a voltage identification (VID) value provided by the CPU, and the method comprising:
   continuously sensing an inductor current of the voltage regulator to thereby output a current sense signal;
   during a first steady state operation period of the VID value of the CPU keeping at a first value, sampling the current sense signal to thereby obtain a sampling result for providing a droop control signal;
   during a VID transient period of the VID value changing from the first value to a second value, stopping sampling the current sense signal to hold the sampling result to keep the droop control signal unchanged and from being affected by the transient change of the VID value; and
   during a second steady state operation period of the voltage identification value keeping at the second value, re-sampling the current sense signal to thereby obtain a new sampling result for providing a new droop control signal.

10. The method according to claim 9, further comprising:
   taking the droop control signal as a consideration factor for generating a pulse width modulation signal to regulate the output voltage of the voltage regulator.

* * * * *